United States Patent
Antanies

(10) Patent No.: US 7,283,928 B2
(45) Date of Patent: Oct. 16, 2007

(54) COMPUTERIZED METHOD AND SOFTWARE FOR DATA ANALYSIS

(76) Inventor: John Antanies, 1017 S. Maple, Tempe, AZ (US) 85281

( * ) Notice: Subject to any disclaimer, the term of this patent is extended or adjusted under 35 U.S.C. 154(b) by 488 days.

(21) Appl. No.: 10/954,082

(22) Filed: Sep. 30, 2004

(65) Prior Publication Data

US 2006/0066617 A1    Mar. 30, 2006

(51) Int. Cl.
*G06F 17/18* (2006.01)
(52) U.S. Cl. .................................... 702/179
(58) Field of Classification Search ............... 702/59, 702/65, 68, 80, 81, 83, 95, 120, 123, 146, 702/179, 183, 185; 705/7, 8, 36 R; 706/12, 706/60; 700/52, 97
See application file for complete search history.

(56) References Cited

U.S. PATENT DOCUMENTS

| | | | | |
|---|---|---|---|---|
| 5,546,516 | A * | 8/1996 | Austel et al. ............... | 345/440 |
| 5,694,524 | A * | 12/1997 | Evans ......................... | 706/12 |
| 5,850,339 | A * | 12/1998 | Giles .......................... | 700/52 |
| 6,098,063 | A | 8/2000 | Xie et al. ..................... | 706/60 |
| 6,110,109 | A | 8/2000 | Hu et al. ..................... | 600/300 |
| 6,507,832 | B1 | 1/2003 | Evans et al. ................. | 706/61 |
| 6,539,392 | B1 | 3/2003 | Rebane ....................... | 707/101 |
| 6,687,558 | B2 | 2/2004 | Tuszynski .................... | 700/97 |
| 2001/0041995 | A1 | 11/2001 | Eder ............................ | 705/7 |
| 2002/0091609 | A1 | 7/2002 | Markowski ................ | 705/36 R |
| 2002/0103688 | A1 | 8/2002 | Schneider ................... | 705/8 |
| 2002/0152148 | A1 | 10/2002 | Ebert .......................... | 705/35 |
| 2003/0004903 | A1 | 1/2003 | Kehder et al. ................ | 706/13 |
| 2003/0050048 | A1 | 3/2003 | Abed et al. ............... | 455/414.1 |
| 2003/0050814 | A1 | 3/2003 | Stoneking et al. ............ | 705/7 |
| 2004/0064353 | A1 | 4/2004 | Kim et al. ..................... | 705/8 |
| 2004/0122860 | A1 | 6/2004 | Srinivasan ............... | 707/104.1 |

* cited by examiner

*Primary Examiner*—Carol S. W. Tsai
*Assistant Examiner*—Mohamed Charioui
(74) *Attorney, Agent, or Firm*—Richard C. Litman

(57) ABSTRACT

The computerized method for data analysis is a computerized method for identifying a causal relationship between at least one independent variable and a dependent variable in a set of data representing historical operating parameters of an industrial process. Data representing historical operating parameters of an industrial process is input into a computer system. A dependent variable and at least one independent variable are identified. A plurality of data sampling periods, such as days of operation, are identified for organization of the data. Dependent and independent variable data are collected from the historical data for each of the data sampling periods. Data sampling periods are ordered, according to the independent variable data, into distribution sets. Once the distribution sets have been arranged, average values are calculated for the dependent and independent variable data, and then graphed to relate the dependent variable data to the independent variable data.

14 Claims, 11 Drawing Sheets

COMPUTERIZED METHOD AND SOFTWARE FOR DATA ANALYSIS

BACKGROUND OF THE INVENTION

1. Field of the Invention

The present invention relates to data analysis. More particularly, the invention is a computerized method and software for data analysis using a distribution of independent variable samples graphed in comparison to dependent variable data to identify a correlation between the independent and dependent variables.

2. Description of the Related Art

Industrial and manufacturing processes often employ a complex series of manufacturing steps, applied to one or more raw materials, to produce a product. A business goal is, generally, to maximize the process productivity by eliminating unscheduled downtime of the process, while maintaining a quality standard of the product. Machine processes are typically instrumented, employing a variety of sensors in communication with a computer system to measure and record various parameters relating to raw materials, the process itself, and the product. The data collected is useful to monitor equipment operation for consistency, and to track quality of both raw material and finished product. Additionally, faults that lead to costly production line downtime can be recorded.

In the example of a paper manufacturing process, pulp enters a process and, ultimately, is formed onto paper in the form of a continuous web roll. As the pulp is converted into paper, the paper is transported through the process machinery across rollers and through various pressure nips, according to various phases of the process. It can be recognized that a break in the paper web causes the processing machinery to be shut down while damage waste paper is removed, a remaining good portion of the web re-fed through the machinery, and rejoined to a take-up roll. Thus, it is desirable to determine the cause of any such breaks and to identify a solution. However, given the number of factors that each may play a role; such as the speed of the paper web through processing machinery, pressure applied at various pressure nips in the process, temperatures at various phases of the process, and the tension applied to the paper web, as well as various properties of the pulp used, the solution may not be readily apparent. Additionally, a problem and solution identified for a given grade of pulp may differ substantially from problems encountered with a different pulp.

Various methods have been employed to analyze data gathered relating to an industrial process for the purpose of identifying problem causation. Typically, known instrumentation and data recording systems gather a large amount of data, and then make the data available to commercial computer spreadsheet programs for treatment by standalone statistical analysis applications.

Standalone statistical analysis applications often require that a user manually "cleans" the data, to ensure that only good data is included in the analysis. Data that is out-of-range, or is indicative of (or resulting from) a sampling error or failure, or that is otherwise considered to be bad data must be eliminated. Additionally, within the remaining set of good data, there may be data that is not of interest, such as good data that does not fall within certain criteria of interest for a particular analysis. Further, limitations such as a minimum desired number of observations within a time interval must be considered.

The statistical techniques used are based on parametric statistics, requiring certain assumptions to be made initially to produce usable results. Such assumptions are often ignored, leading to compromised results. Most tools using a parametric method employ regression-based analysis, often leading to a problem of causation versus correlation.

Consequently, there is a need for an automated process for mining data accumulated from a computerized data historian that monitors a manufacturing process, and analyzes the data to determine factors in the manufacturing process that need to be altered in order to improve the efficiency of the manufacturing process. Thus, a computerized method and software for data analysis solving the aforementioned problems is desired.

SUMMARY OF THE INVENTION

The computerized method and software for data analysis is a computerized method for identifying a causal relationship between at least one independent variable and a dependent variable in a set of data representing historical operating parameters of an industrial process.

Data representing historical operating parameters of an industrial process is input into a computer system. A dependent variable is identified within the set of data is identified, the dependent variable representing a fault or other condition within the industrial process. Additionally, at least one independent variable is identified within the set of collected data. A plurality of data sampling periods, such as days of operation, are identified for organization of the data. Dependent variable data and independent variable data are collected from the set of data for each of the data sampling periods.

Once the data has been gathered for each of the data sampling periods, independent variable data is used to organize the data sampling periods into distribution sets. For each independent variable, distribution breakpoints are determined to define distribution sets of the data sampling periods. For example, the data sampling periods may be ranked into quartile distribution sets by defining at least three distribution breakpoints separating the quartile distribution sets.

For each of the independent variables, once the distribution sets have been arranged into distribution quartiles, average values are calculated for the dependent variable data and the independent variable data. A graph is then generated to relate the dependent variable data to the independent variable data, the graph visually presenting the data to aid in determining a causal relationship between at least one of the independent variables and the fault or other condition.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1A:
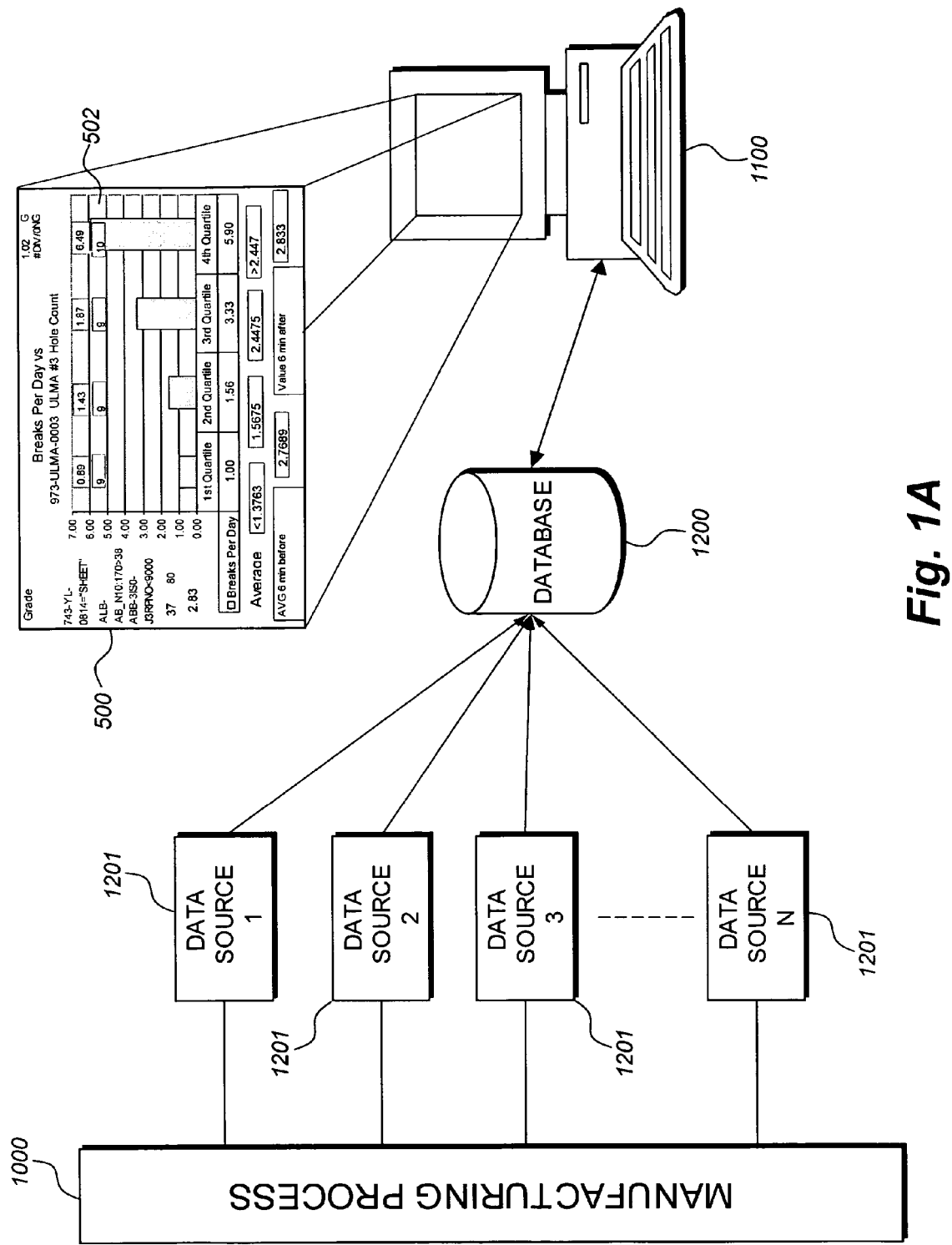
FIG. 1A is a block diagram of a computer system employing a computer program to perform a computerized method for data analysis according to the present invention.

The present invention computerized method and software for data analysis provides a computerized method for identifying a causal relationship between at least one independent variable and a dependent variable in a set of data representing historical operating parameters of an industrial process, and software for carrying out the method. Referring to FIG. 1A, the computerized method and software for data analysis is executed on a computer 1100, such as a typical personal computer or the like. The computer 1100 accesses data from a database 1200, including data obtained from at least one data source 1201 in communication with an industrial or manufacturing process 1000. Various methods of automating manufacturing equipment, and recording historical data derived from a manufacturing process 1000, are well known to those skilled in the art. Database 1200 thus contains a set of data representing historical operating parameters of an industrial process. Note that the database 1200 may be maintained within the computer 1100, or may be a separately maintained database, such as a database server accessed on a computer network.

The computerized method for data analysis involves inputting selected data from the database 1200 into the computer 1100. The selected data is organized into sample sets, such as all data samples collected in a single day. The selected data includes, within each sample set, at least one independent variable and one dependent variable, wherein the dependent variable is typically chosen to represent a fault condition, or a quality measure, production rate, speed, etc., within the manufacturing process 1000.

The sample sets are arranged, according to an independent variable, into distribution sets. In the illustrated embodiment, the distribution sets are quartile sets, although the present invention is not limited to quartile distribution sets. The distribution sets are used to generate a graph displayed on the computer 1100 that relates independent variable data to the dependent variable, illustrating a correlation between the independent and dependent variables to aid in determining a cause and effect relationship.

Figure 1B:
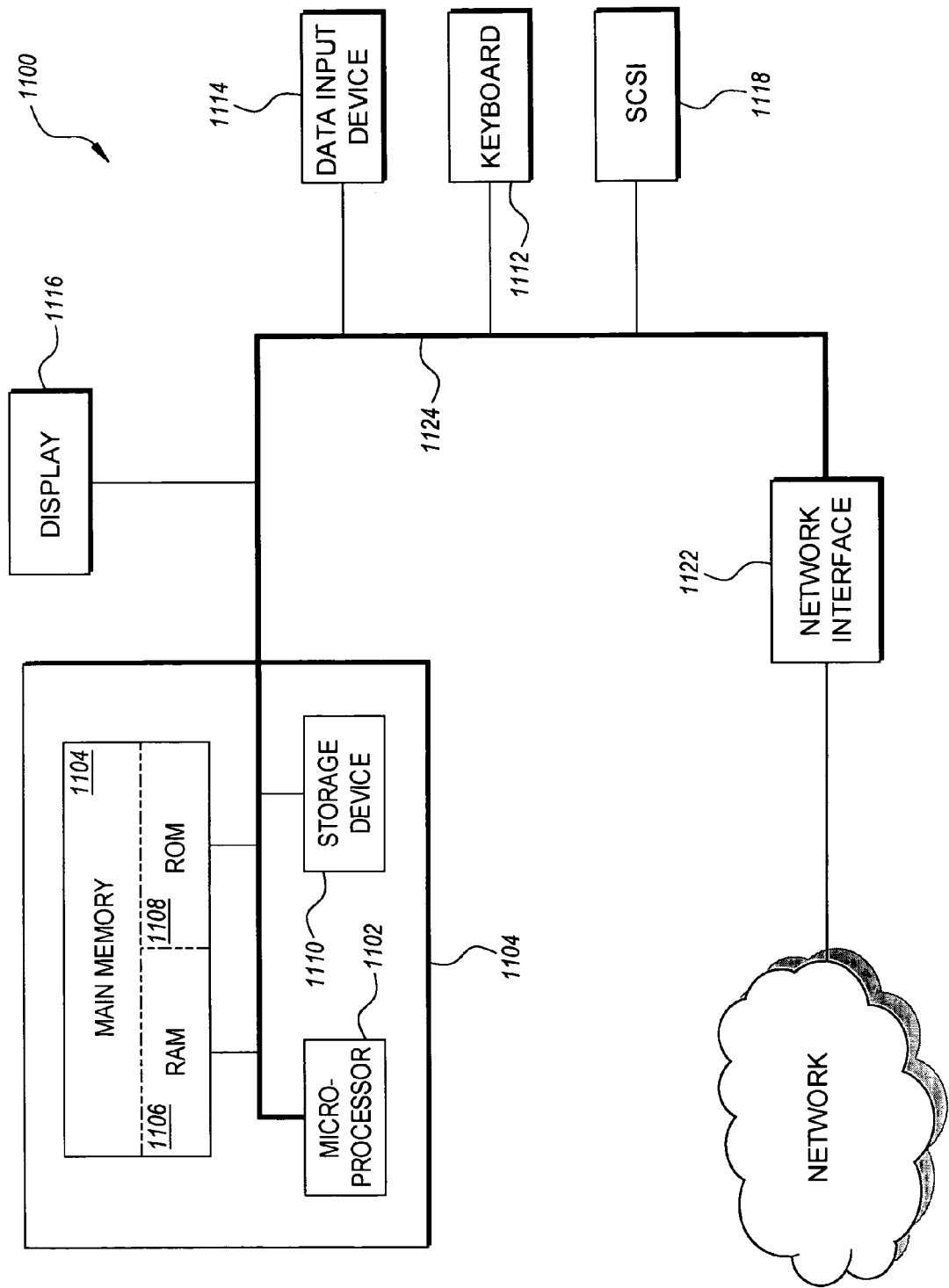
FIG. 1B is a block diagram of a computer system in which software for data analysis operates according to the computerized method for data analysis.

The computerized method and software for data analysis comprises a computerized method for data analysis implemented by software executing on a computer 1100. Referring to FIG. 1B, the computer 1100 is a general purpose or personal computer of a generally known and common configuration. Such a computer has a microprocessor 1102 connected by a bus 1124 to an area of main memory 1104, comprising both read only memory (ROM) 1108, and random access memory (RAM) 1106, and a storage device 1110 having means for reading a coded set of program instructions on a computer readable medium which may be loaded into main memory 1104 and executed by the microprocessor 1102. The computer 1100 has a display device 1116, a keyboard 1112, and may include other input devices 1114 such as automating devices in communication with the manufacturing process 1000, a mouse, joystick, etc. A network communication interface 1122 is provided for serial communications on a network or other serial communications link. Additionally, the computer 1100 may include a Small Computer System Interface (SCSI) adapter 1118 for communication with peripheral devices, including data sources 1201 such as automating devices in communication with the manufacturing process 1000.

Figure 2A:
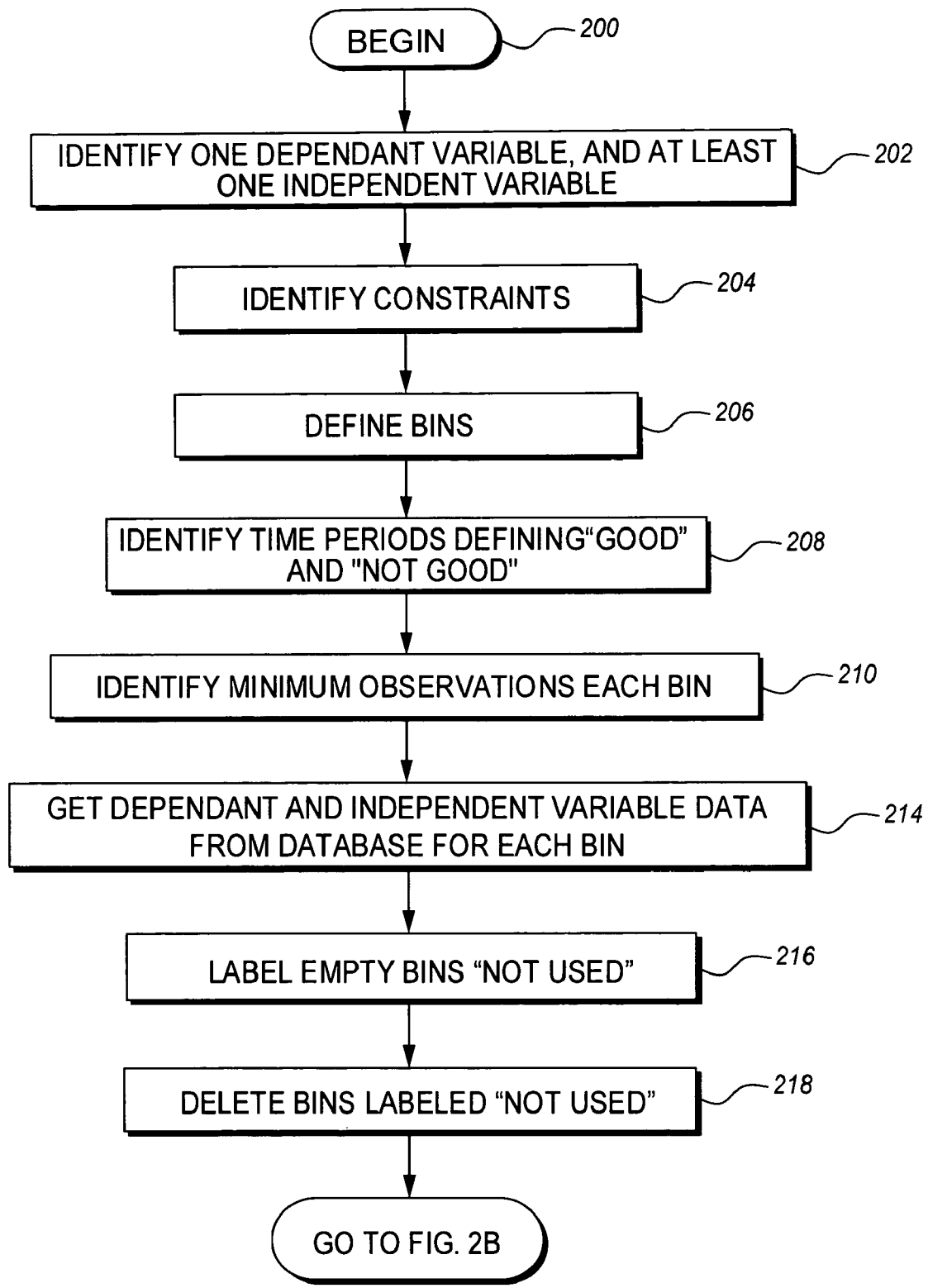
FIGS. 2A and 2B are a flow chart of a computerized method for data analysis according to the present invention.
Figure 2B:
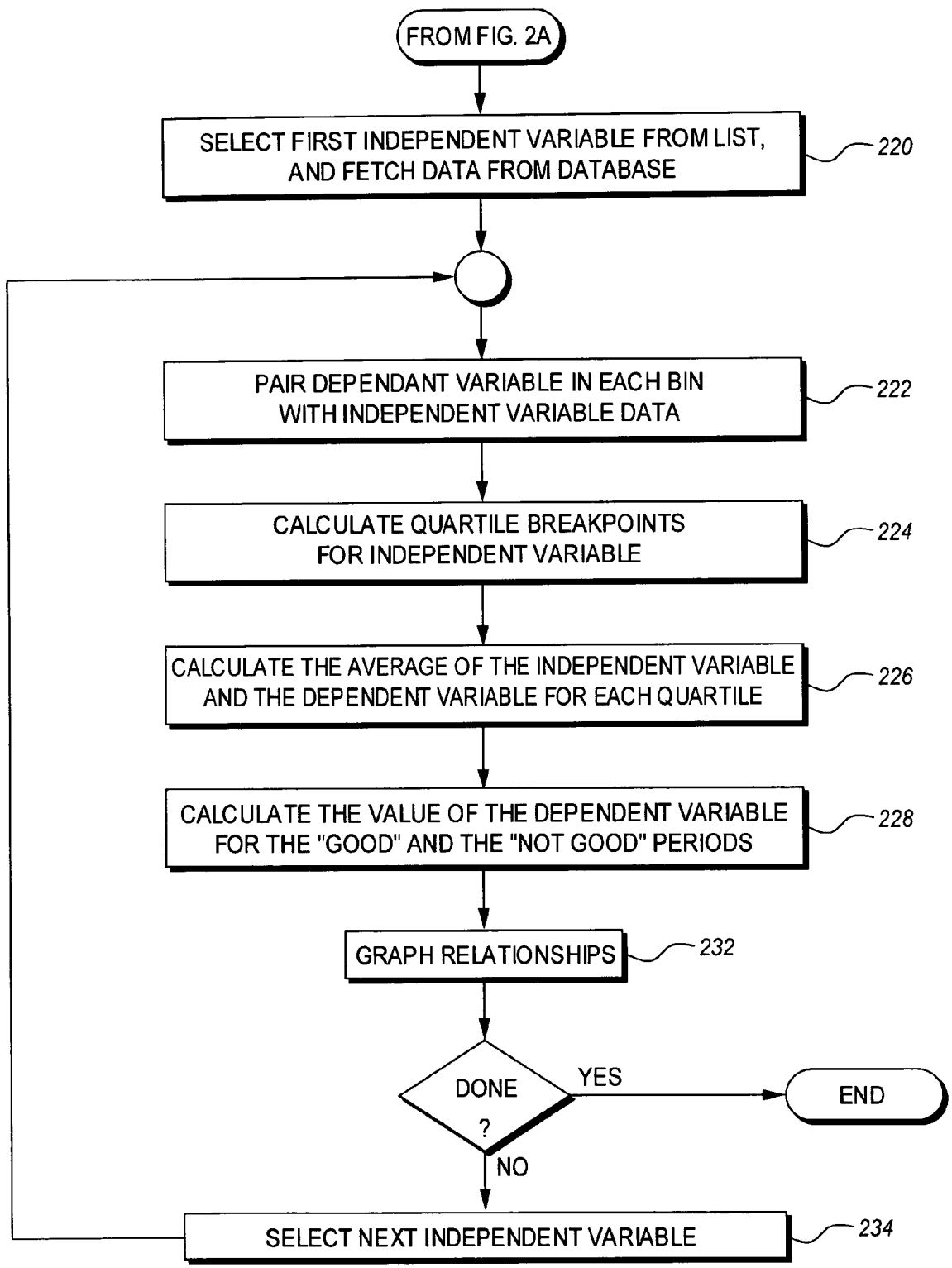
Figure 3A:
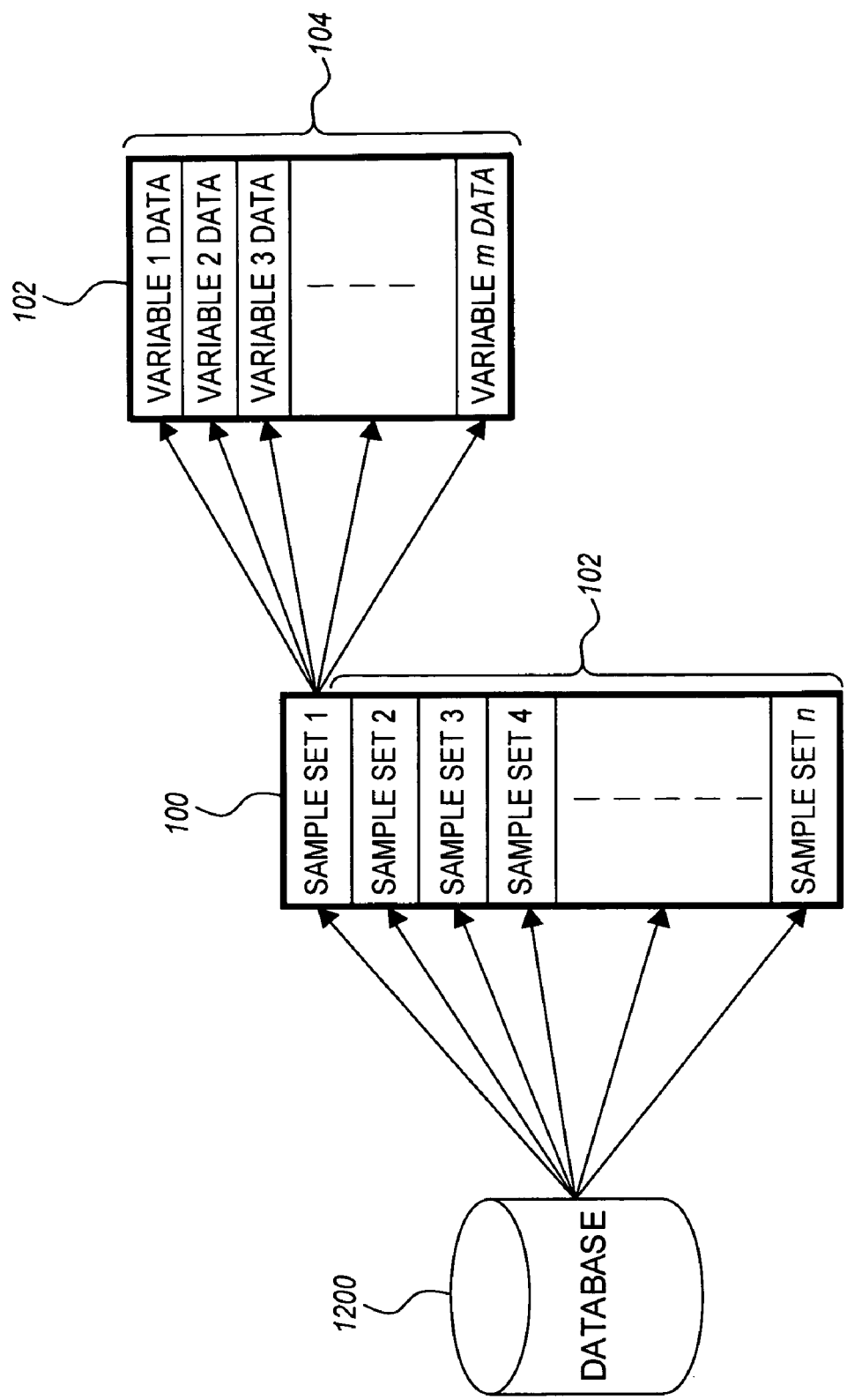
FIGS. 3A, 3B and 3C are block diagrams depicting a data transformation from raw historical data to filtered data organized into bins for analysis.
Figure 3B:
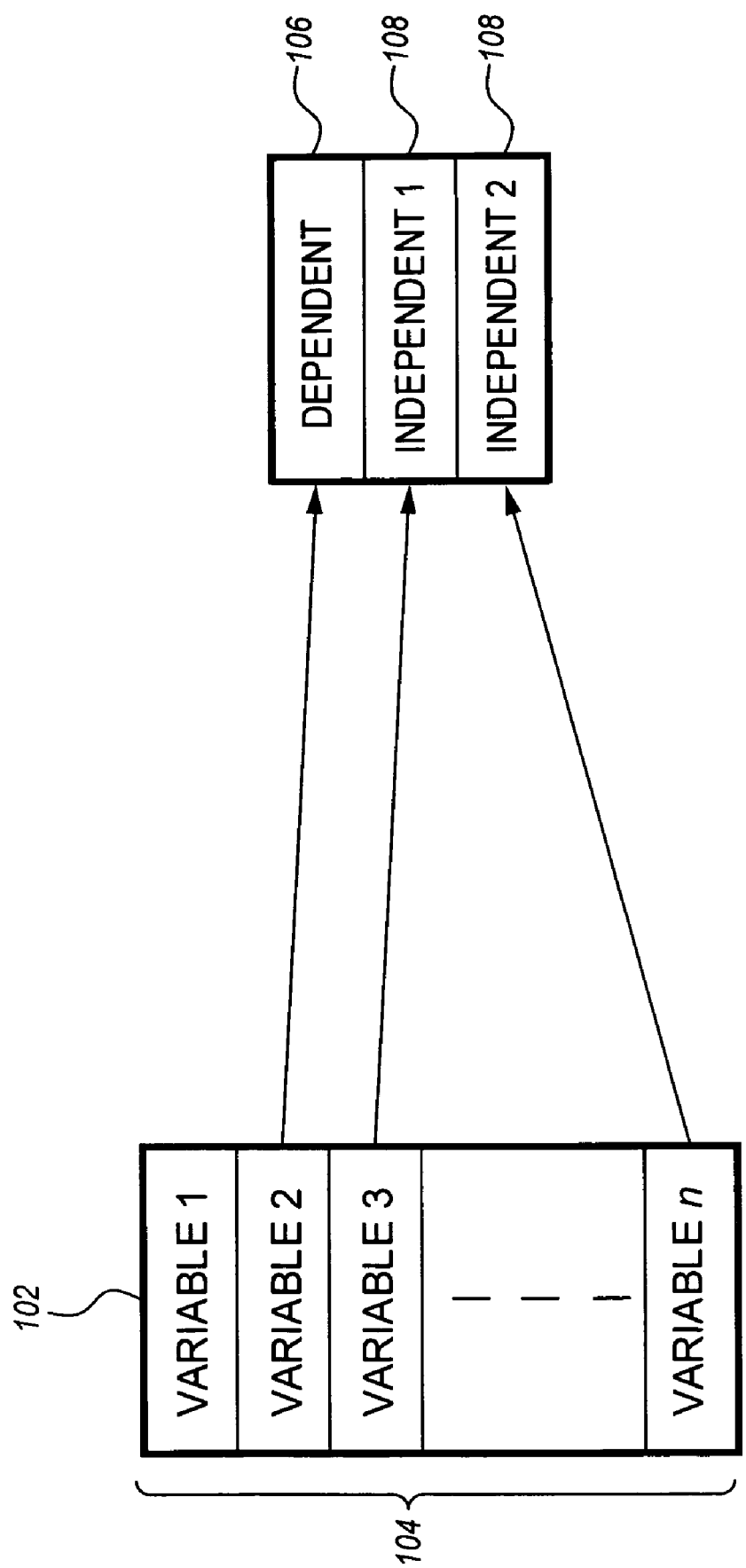
Figure 3C:
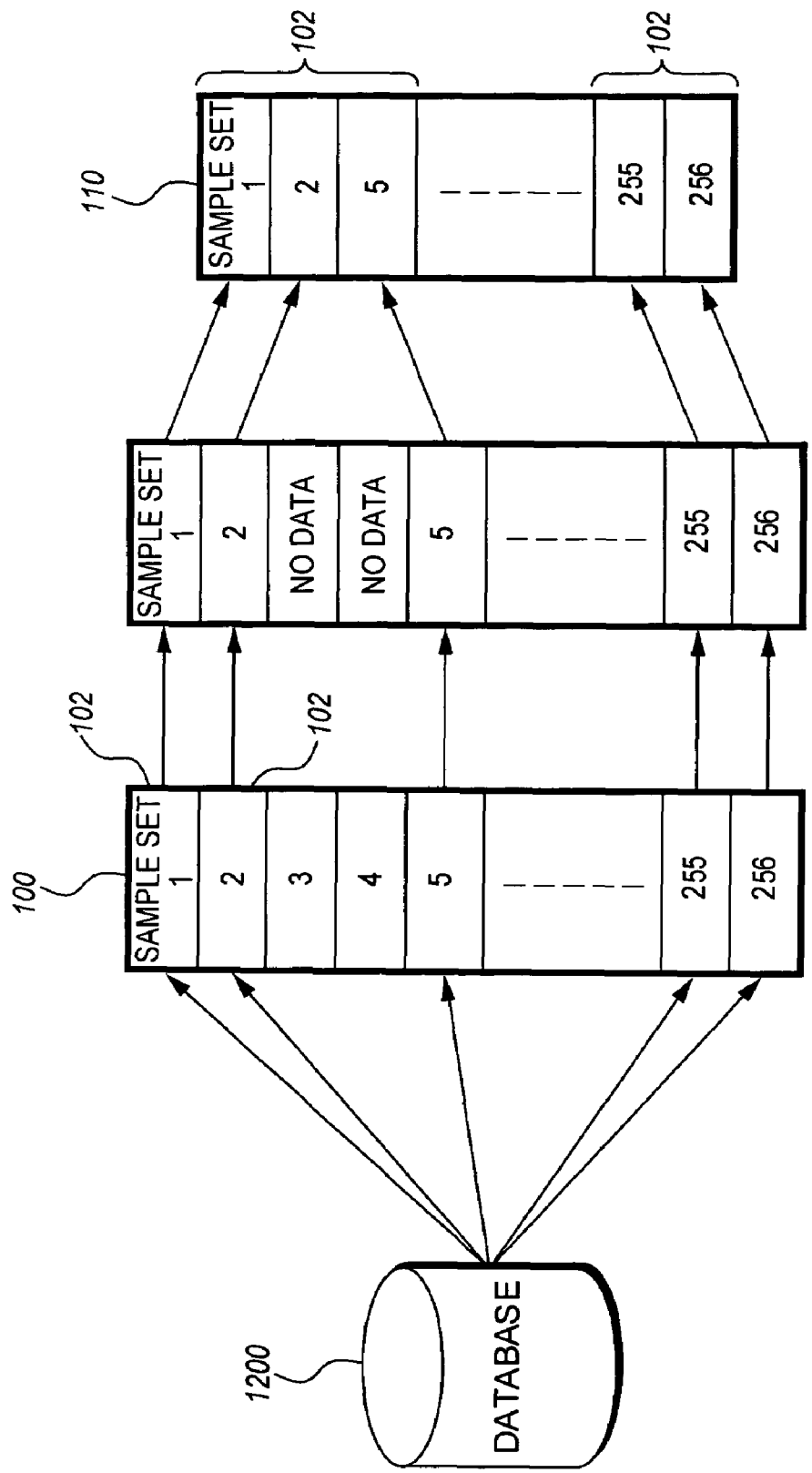

Turning now to FIGS. 2A and 2B, a flowchart illustrates the computerized method for data analysis is described in greater detail. Referring particularly to FIG. 2A along with FIGS. 3A, 3B, and 3C, he process begins, at step 200, with a series of steps wherein a user enters information relating generally to identifying the data to be analyzed, and the data is retrieved accordingly from the database 1200. The database 1200 contains data samples for a number of variables spanning a statistically useful historical time period. For the purposes of analysis, the data samples are organized into a raw collection 100 of sample sets or "bins" 102, each bin 102 being a uniform portion of the historical time period, such as a day or an hour. Within each bin 102 are data samples for several of the data variables 104. One of the data variables is designated as the dependent variable 106 (step 202), the dependent variable generally being a variable related to a particular fault condition, or a quality measure, production rate, speed, etc., within the manufacturing process 1000. At least one of the variables is designated as an independent variable 108. Constraints are identified for the dependent variable 106 and the independent variable 108, such as minimum or maximum values, or a range of data considered useful or desirable for a particular analysis (step 204).

Bins 102 are defined by setting the size and number of the bins desired for analysis. For example, each bin 102 might be defined to contain a day's worth of data samples, and two hundred and fifty six (256) bins 102 might be used (step 206). Also, a minimum number of samples may be specified for the bins 102. In addition to the bins 102, a time period may be identified to define a period of "good" process performance versus a period of "bad" process performance (step 208).

Once the bins 102 have been defined, data for the dependent variable 102 and the independent variable(s) are retrieved from the database for each of the bins 102 (step 214), according to the constraints that were defined by the user. Note that the dependent variable 106 might be represented within a bin 102 as a single data value (such as the count of an event occurring within the time frame of a bin 102), or as a number of data samples (such as a periodic sampling of a parameter within the time frame of a bin 102). If the dependent variable 106 is represented as a number of data samples, the average value for the number of data samples within a bin 102 is determined, along with a coefficient of variation, and recorded as the dependent variable value. As a result of the data constraints applied to the data retrieved from the database 1200, some of the bins 102 may have no data. Bins 102 with no data, or bins 102 that contain less than a specified minimum number of samples, are marked (step 216) and deleted (step 218). As an alternative, in addition to deleting the bins 102 that have been marked, new bins 102 may be identified within the database 1200 to replace the deleted bins, maintaining the desired number of bins 102. The result is a cleaned collection 110 of bins 102 that contain valid and relevant data for the dependent variable 106 and the independent variables 108.

Figure 4:
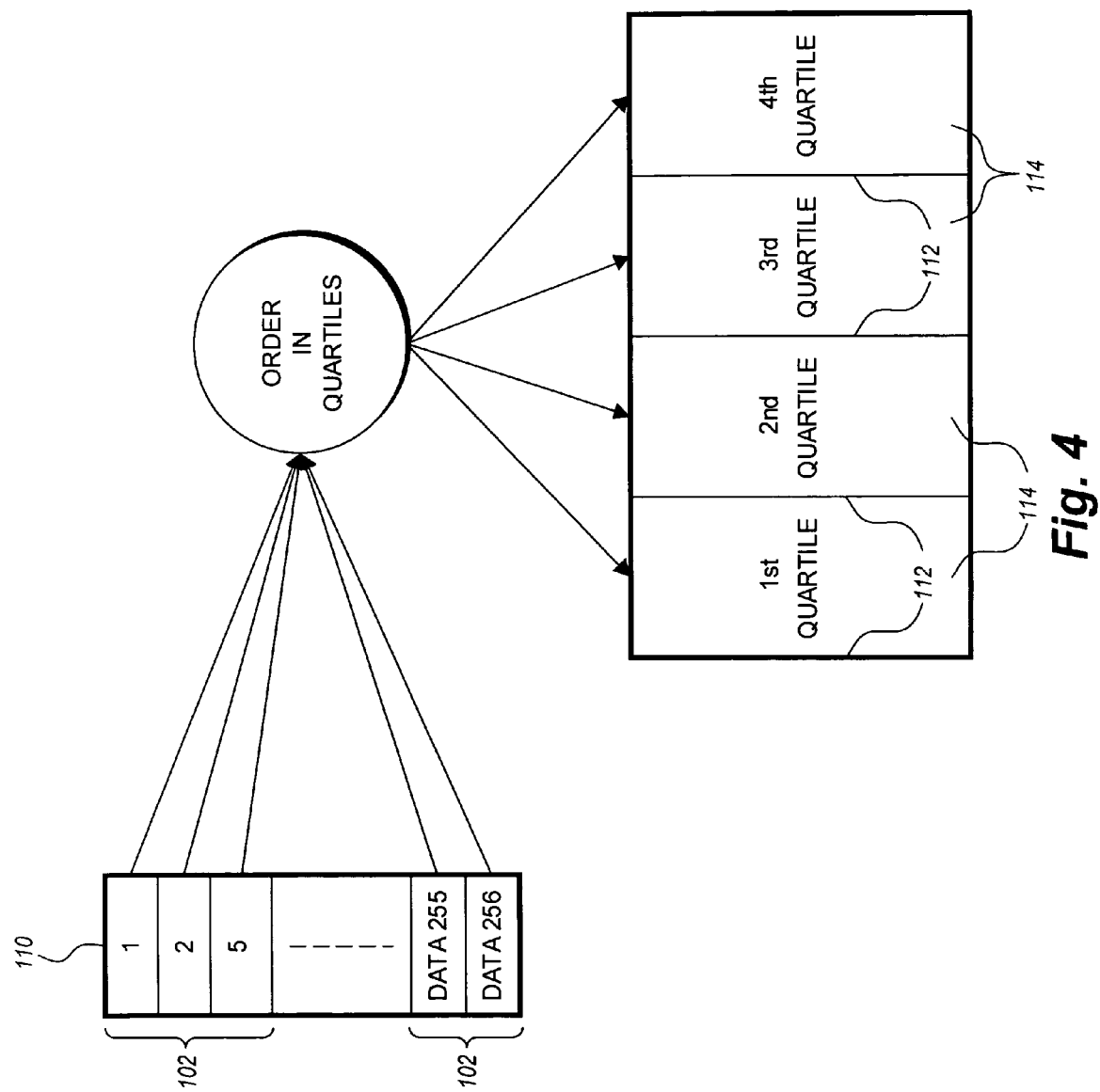
FIG. 4 is a block diagram depicting a data transformation from historical data organized in bins into a quartile distribution of the data.

Turning now to FIG. 2B, along with FIG. 4, the bins 102 are ranked according to an independent variable 108, and separated into a plurality of distribution sets 114, and a graph is produced to visually relate the dependent variable data to the independent variable data. The bins 102 may be ranked by the average value of the independent variable 108 within each bin, or by the coefficient of variation of the independent variable 108 data within the bins, or both. In the embodiment illustrated, the distribution sets 114 consist of four (4) quartile sets. This is repeated for each independent variable 108.

At step 220, a first independent variable is selected from a list of the independent variables identified previously at step 202. The bins 102 are then ordered into an ascending (or descending) series according to the independent variable data (step 222), using the average value or the coefficient of variation for each bin 102. The independent variable data is then used to calculate breakpoints 112 that divide the series of bins 102 into a plurality of distribution sets 114 (step 224). The distribution sets 114 may be determined to contain approximately the same number of bins 102, or may be determined by another criteria, such as a weighted distribution of the independent variable data. For each of the distribution sets 114, the average value of the independent variable 108 and the average value of the dependent variable 106 are determined (step 226). Additionally, a coefficient of variation may be determined for the independent variable 108 and for the dependent variable 106.

In addition to the distribution sets 114, data values or averages may be determined for the "good" and "not good" periods defined previously (step 228).

Figure 5:
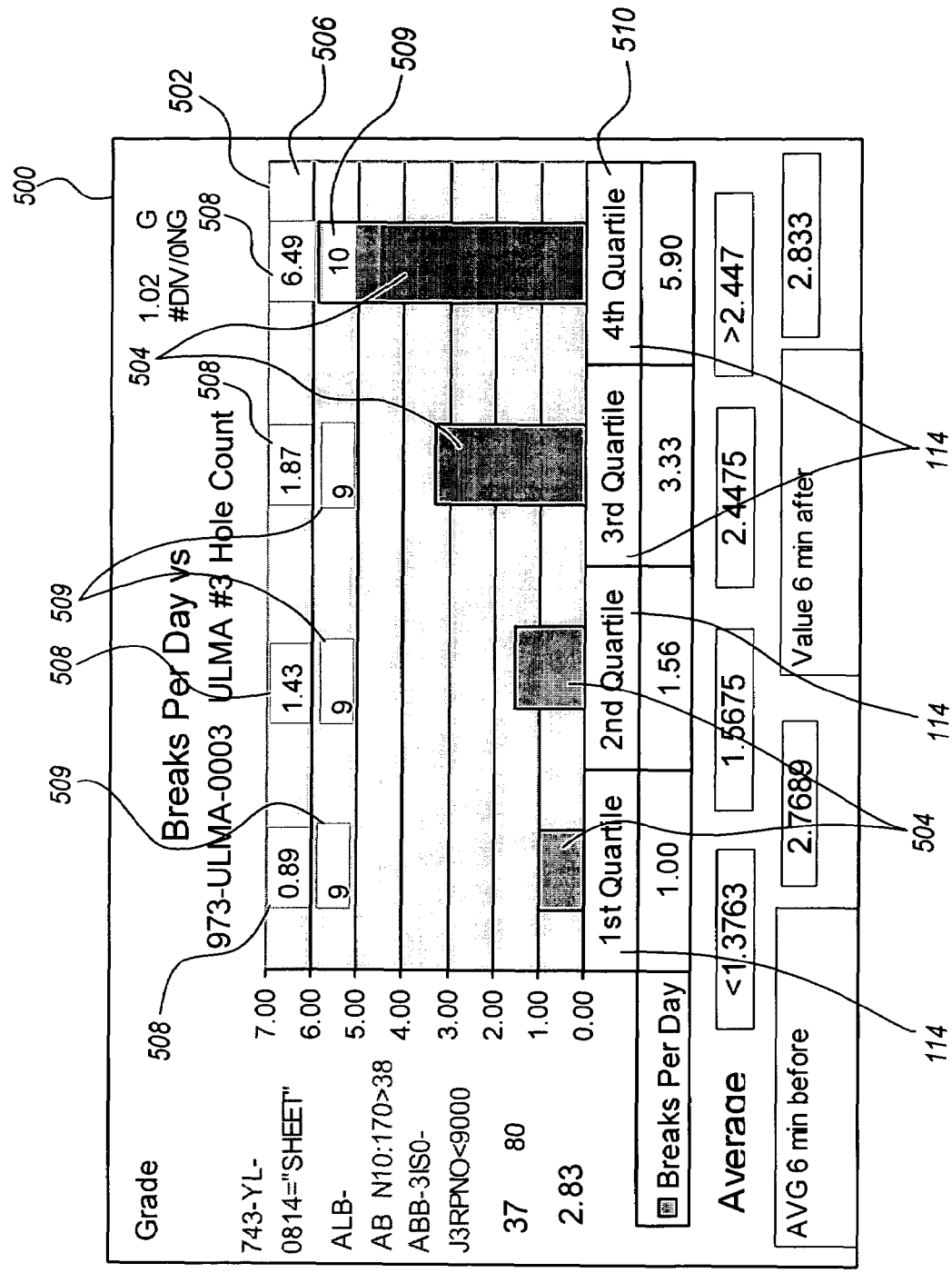
FIG. 5 is a screen shot illustrating a quartile distribution of an independent variable and its mapping to dependent variable data.

A graph is generated to visually associate the independent variable 108 and the dependent variable 106 average values. Referring to FIG. 5, a display image 500 is shown including a bar graph 502. The bar graph 502 includes a vertical bar 504 for each of the distribution sets 114, the vertical extent of each bar 504 indicating the average value for the dependent variable 106 within the associated distribution set 114. Along the top of the bar graph 502, an independent variable legend 506 displays the independent variable average value 508 for each of the distribution sets 114. A bin count legend 509 displays the number of bins 102 within each of the distribution sets 114. Note that a graph may be derived from either the average value or the coefficient of variation of the independent variable within each bin 102.

If additional independent variables 108 were identified, the next independent variable is selected (step 234) and the process repeated from step 222.

The bar graph 502 depicted in FIG. 5 shows a number of breaks per day in a paper manufacturing process verses a hole count, wherein breaks per day refers to breaks in the paper product web, while the hole count is a count of holes in the paper product web at a particular point in the paper manufacturing process. It can be recognized, by inspection of the bar graph 502, that there is a correlation between the breaks per day and the hole count. A fourth quartile 510 distribution set 114, which contains the highest independent variable values, also indicates the highest number of breaks per day.

Figure 6:
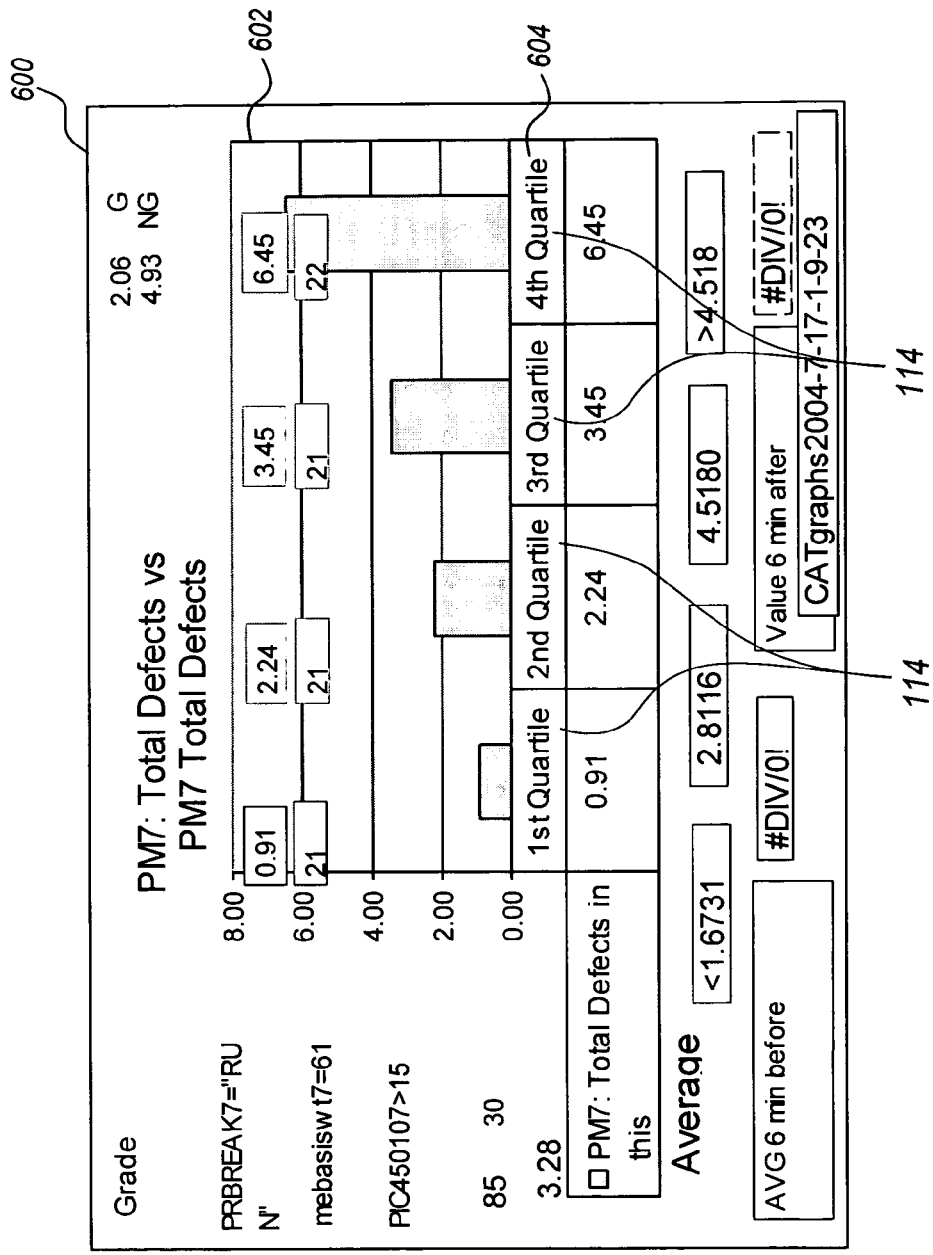
FIG. 6 is a screen shot illustrating the comparison of a dependent variable to itself to obtain a quartile distribution of the dependent variable.

Turning now to FIG. 6, a special case is illustrated wherein the same variable is selected as both the dependent variable 106 and the independent variable 108. The resulting display image 600 includes a bar graph 602 that depicts a distribution of the dependent variable across the quartile distribution sets 114. The bar graph 602 depicted in FIG. 6 ranks the variable "Total Defects" into quartile distribution sets 114. It is worth noting that this distribution identifies the "worst case" 604 among the distribution sets 114 for the dependent variable 106. Thus, it is useful to know that no other independent variable 108 can have a single distribution set 114 with a greater dependent variable 106 average value, unless the distribution set 114 based on a different independent variable 108 contains fewer bins 102.

It can be recognized that, once distribution sets 114 are determined for a given independent variable 108 and a given set of defined constraints, the distribution sets 114 and their associated average and coefficient of variation values for the independent variable do not change for subsequent analyzes utilizing different dependant variables 106, except for generally trivial changes that may result if, for example, pairings of independent variable 108 and dependent variable 106 samples result in slightly different distribution set 114 breakpoints. This allows for the comparison of multiple graphs, based on several dependent variables 106 each graphed against the same independent variable 108 distribution sets 114, to reveal causal relationships among the variables rather than a mere correlation.

Figure 7:
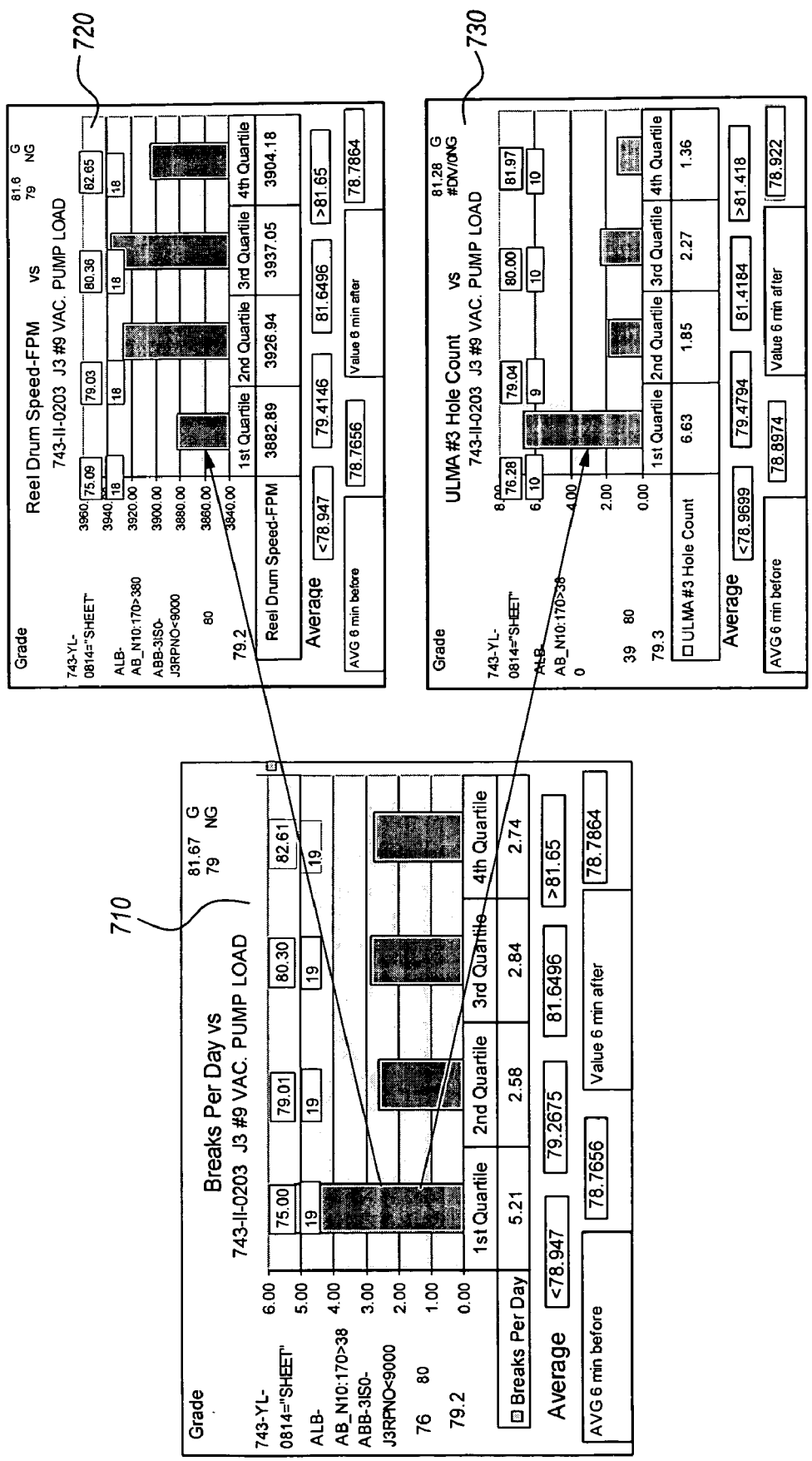
FIG. 7 illustrates the graphical relationship between multiple analyses showing a correlation between a dependent variable and at least one independent variable.

Turning to FIG. 7, it is shown that the computerized method for data analysis provides great insight into cause and effect relationships when multiple graphs are produced to discover relationships between multiple dependent variable 106 and independent variable 108 parings. In the example illustrated in FIG. 7, a paper manufacturing process for producing a manufactured paper web is analyzed to determine a cause of excessive paper breaks within the process in a day. Data collected from the paper manufacturing process includes the number of paper breaks per day, a measured vacuum pump load, a reel drum speed, and a count of holes found in the manufactured paper web (hole count). In each of three analyses, the measured vacuum pump load ("#9 VAC. PUMP LOAD") is used as the independent variable 108. In a first analysis, wherein the computerized method for data analysis results in graph 710, the number of paper breaks per day ("Breaks Per Day") is chosen as the dependent variable 106. The resulting graph 710 reveals that the breaks per day are correlated with a low vacuum pump load.

Additionally, in a second analysis, wherein the computerized method for data analysis results in graph 720, the reel drum speed ("Reel Drum Speed-FPM") is chosen as the dependent variable 106. The resulting graph 720 reveals that the real drum speed is also correlated with a low vacuum pump load. Finally, in a third analysis, wherein the computerized method for data analysis results in bar graph 730, the hole count ("#3 Hole Count") is chosen as the dependent variable 106. The resulting bar graph 730 reveals that the hole count too is correlated with a low vacuum pump load.

It follows that, while a comparison of breaks per day against reel drum speed and against hole count may indicate a correlation, the presentation of multiple analyses, effectively holding constant the independent variable across each analyses, reveals with a significant degree of confidence an actual causation of the paper breaks. Thus, it can be seen that the computerized method for data analysis results in a graphical presentation of data gathered from a manufacturing process to reveal a causation of a fault condition, or a quality measure, production rate, speed, etc., within the manufacturing process.

It is to be understood that the present invention is not limited to the embodiment described above, but encompasses any and all embodiments within the scope of the following claims.

I claim:

1. A computerized method for data analysis, comprising the steps of:
    inputting into a computer a set of data representing historical operating parameters of an industrial process;
    selecting a dependent variable and at least one independent variable within said set of data, the dependent variable representing a condition related to the industrial process;
    identifying a plurality of data sampling periods;
    collecting dependent variable data and independent variable data from said set of data for each of said data sampling periods;
    for each said independent variable, calculating a plurality of distribution breakpoints, the distribution breakpoints defining a plurality of distribution sets of said data sampling periods;
    for each said distribution set of said data sampling periods, calculating an average value of said dependent variable data and calculating an average value of said independent variable data; and
    for each said independent variable, creating and displaying on said computer a graph relating said average value of said dependent variable data to said average value of said independent variable data;
    wherein said graph aids in determining a causal relationship between at least one of said independent variables and the condition.

2. The computerized method for data analysis according to claim 1, wherein the step of identifying a plurality of data sampling periods includes defining the number of said data sampling periods.

3. The computerized method for data analysis according to claim 1, wherein the step of identifying a plurality of data sampling periods includes defining the size of said data sampling periods.

4. The computerized method for data analysis according to claim 1, wherein said graph is a bar graph.

5. The computerized method for data analysis according to claim 1, wherein said graph is a bar graph comprising, for each distribution set, a bar having an extent indicating the average value for the dependent variable.

6. The computerized method for data analysis according to claim 1, wherein said distribution breakpoints define distribution sets each having approximately the same number of data sampling periods.

7. The computerized method for data analysis according to claim 1, wherein said distribution breakpoints are determined by finding the average value for the independent variable data within of the data sample sets and ranking the data sample sets according to the average value.

8. The computerized method for data analysis according to claim 1, wherein said distribution breakpoints are determined by finding the coefficient of variation for the independent variable data within of the data sample sets and ranking the data sample sets according to the coefficient of variation.

9. A computerized system for performing a method of data analysis, comprising:
    a computer having a processor, an area of main memory for executing program code under the direction of the processor, a storage device for storing data and program code and a bus connecting the processor, the main memory, and the storage device;
    at least one database in communication with said computer, the database containing a set of data representing historical operating parameters of an industrial process;
    a computer program stored in said storage device and executing in said main memory under the direction of said processor, the computer program including:
    means for inputting from said database a set of data representing historical operating parameters of an industrial process;
    means for allowing a user to select a dependent variable and at least one independent variable within said set of data;
    means for allowing a user to identifying a plurality of data sampling periods;
    means for collecting dependent variable data and independent variable data from said set of data for each of said data sampling periods;
    means for calculating, for each said independent variable, a plurality of distribution breakpoints, the distribution breakpoints defining a plurality of distribution sets of said data sampling periods;
    means for calculating, for each said distribution set of said data sampling periods, an average value of said dependent variable data and an average value of said independent variable data; and
    means for displaying, for each said independent variable, a graph relating said average value of said dependent variable data to said average value of said independent variable data.

10. The computerized system for performing a method of data analysis according to claim 9, wherein said graph is a bar graph.

11. The computerized system for performing a method of data analysis according to claim 9, wherein said graph is a bar graph comprising, for each distribution set, a bar having an extent indicating the average value for the dependent variable.

12. The computerized system for performing a method of data analysis according to claim 9, wherein said distribution breakpoints define distribution sets each having approximately the same number of data sampling periods.

13. The computerized method for data analysis according to claim 9, wherein said distribution breakpoints are determined by finding the average value for the independent variable data within of the data sample sets and ranking the data sample sets according to the average value.

14. The computerized method for data analysis according to claim 9, wherein said distribution breakpoints are determined by finding the coefficient of variation for the independent variable data within of the data sample sets and ranking the data sample sets according to the coefficient of variation.

* * * * *